United States Patent [19]
Groelz

[11] 3,972,478
[45] Aug. 3, 1976

[54] HYDRAULIC ACTUATED LOAD SENSING GOVERNOR

[75] Inventor: Jay C. Groelz, Phillips, Nebr.

[73] Assignee: Heinzman Engineering, Inc. (Entire), Grand Island, Nebr.

[22] Filed: Dec. 30, 1975

[21] Appl. No.: 645,478

[52] U.S. Cl. ............................ 239/189; 239/191; 137/355.16
[51] Int. Cl.² ............................................ B05B 3/18
[58] Field of Search .................. 239/189, 195–199, 239/183, 191, 192; 137/355.16, 355.18, 355.19

[56] References Cited
UNITED STATES PATENTS

| | | |
|---|---|---|
| 1,142,448 | 6/1915 | Lord ............................... 239/191 X |
| 2,958,470 | 11/1960 | Giwosky ........................ 239/191 X |
| 3,489,352 | 1/1970 | Diggs ................................ 239/189 |
| 3,583,639 | 6/1971 | Cornelius ....................... 239/191 X |
| 3,687,372 | 8/1972 | Badcock ............................ 239/183 |
| 3,841,561 | 10/1974 | Lacey ............................... 239/189 |
| 3,848,805 | 11/1974 | Courtright ......................... 239/189 |

*Primary Examiner*—Robert S. Ward, Jr.
*Attorney, Agent, or Firm*—Clarence A. O'Brien; Harvey B. Jacobson

[57] ABSTRACT

A hydraulic actuated load sensing governor device for use with a wheel mounted sprinkler which is driven from an inward radial discharge type turbine. This inward radial discharge turbine has an inverse pressure-speed characteristic which is an important part of the governor operation.

12 Claims, 7 Drawing Figures

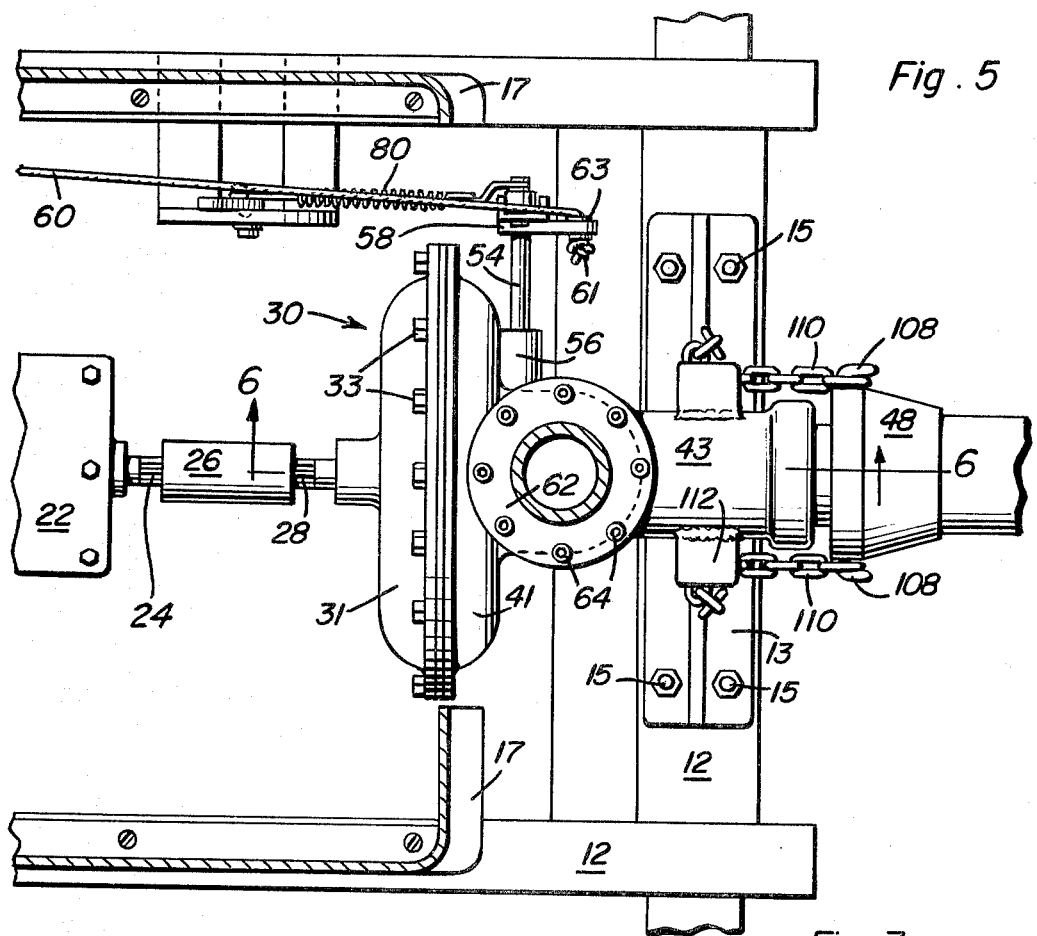
Fig. 5
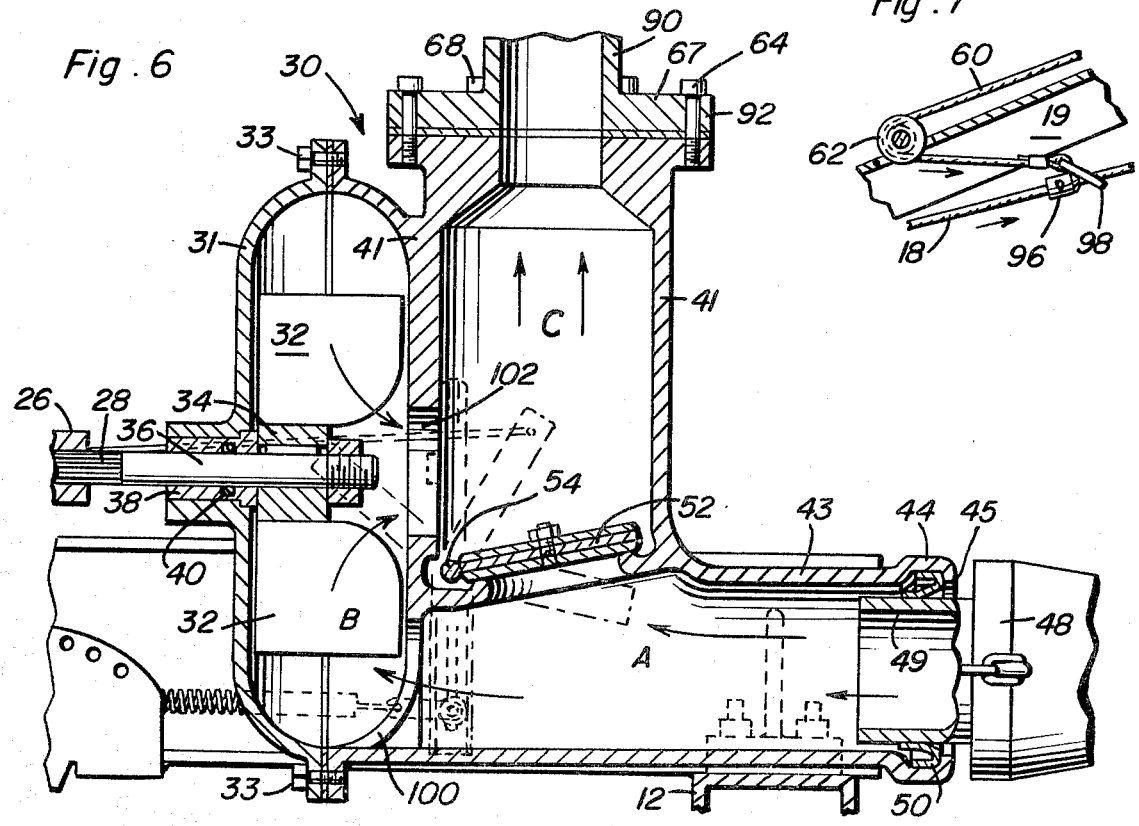
Fig. 6
Fig. 7

HYDRAULIC ACTUATED LOAD SENSING GOVERNOR

BACKGROUND OF THE INVENTION

1. Field of the Invention

This invention relates generally to hose pull traveling sprinkler irrigation machines that use turbines as motive power therefor. Such machines employ various type systems to maintain proper speed and sprinkler action.

2. Description of the Prior Art

A common problem with existing traveling sprinklers is in the fact that the speed thereof must be varied in operation, and it has become common practice to bypass water around the turbine motive power system in order to achieve part of the speed control. Several inherent problems exist with this method of bypassing water around the turbine in order to control speed.

Many of the known prior art traveling sprinkler irrigation machines employ axial flow or propeller type turbines as their motive power. With this type of turbine attempting to control the speed of the turbine by bypassing water around the turbine results in very poor speed regulation, because with this type of turbine the pressure drop across the turbine is directly related to the load, such that as the load increases the pressure drop increases. This results in a greater percentage of the total flow bypassing the turbine when the load dictates that the greatest percentage of the flow should be passing through the turbine. Conversely, when the load is light, the pressure drop across the turbine is small, very little water is caused to pass through the bypass, and the turbine tends to run faster than required. Thus it can be seen that with this type of turbine drive, speed regulation is a great problem.

Another common known type of sprinkler machines employ radial or centrifugal type turbines which do have better results from bypassing water around the turbine than the type described above. The reason being that this type of turbine has a centrifugal pump effect such that the pressure drop across the turbine for a given gallonage of water is an inverse function of the r.p.m. that the turbine is rotating. As the turbine spins faster, due to light loading, the pressure drop across the turbine increases. As the load on the turbine is increased, the r.p.m. drops off, and the pressure drop across the turbine decreases. In other words, an inverse relationship exists between the load and the turbine pressure drop. Because of the very high pressure drop which occurs across the radial turbine when the load is light at the first part of the run, a bypass valve must be used. In tests, pressure drops in excess of 50 pounds per square inch have been recorded, when the bypass is closed and the turbine is unloaded. Any excess pressure drop across the turbine increases pumping costs considerably. For example, an additional 10 pounds per square inch pressure drop across the turbine system at a flow rate of 600 gallons per minute and a pump efficiency of 70%, would require an additional 5 brake horsepower at the pump.

Another problem with this type of turbine and bypass method of governor regulation is the amount of aperture or opening of the bypass valve which is quite critical. If the valve is set too far open, the torque of the turbine will be insufficient to keep the machine moving, after the hose pull increases. When the machine stalls in the field, crop damage will result. If the valve is set too far closed, pumping costs will be increased and/or less water will be delivered to the nozzle of the sprinkler and thus affecting the pattern. In order to maintain linear velocity through a field, the turbine must decrease its r.p.m. as the cable builds up on the winch drum. The operator is expected to use the trial and error method and balance bypass setting and mechanical drive leverage or gearing to achieve linear motion throughout the field and at the same time to acquire the desired speed. This is quite difficult to achieve and is a problem with such systems.

Another problem with the above system is that if the machine is properly calibrated for a given gallonage and field condition, it must be re-calibrated for either a gallonage or field condition change.

Another common problem is that different turbine sizes are required for different gallonage ranges. For example, one turbine size would be used for a range of 200 to 400 gallons per minute and a different size turbine would be used for the 400 to 600 gallons per minute range. This obviously limits the use to which one given sprinkler machine can be put and is quite undesirable.

Known prior art patents which may be pertinent to this invention are listed as follows:

| | | |
|---|---|---|
| 1,142,448 | H. L. Lord | June 8, 1915 |
| 2,958,470 | H. L. Giwosky | Nov. 1, 1960 |
| 3,489,352 | R. E. Diggs | Jan. 13, 1970 |
| 3,583,636 | J. J. Lacey | June 8, 1971 |
| 3,687,372 | N. P. Badcock | Aug. 29, 1972 |
| 3,841,561 | E. H. Lacey | Oct. 15, 1974 |

SUMMARY OF THE INVENTION

An object of the present invention is to provide an improved governor for a hydraulic actuated turbine drive for a sprinkler vehicle.

Another object of this invention is to provide a hydraulically actuated governor for an inward radial type turbine which continually adjusts to fluctuations in load for causing only the required amount of water to pass through the turbine and allowing the remainder to bypass the turbine.

A further object of this invention is to provide an automatic governor for a hydraulic turbine which will automatically increase the amount of water going through the turbine as the load increases.

A still further object of this invention is to eliminate any abnormally high pressure drops across the hydraulic turbine at the beginning of the sprinkler run when the load is light.

Another still further object of this invention is to provide a simple spring tension adjustment for a turbine driven sprinkler machine for permitting the machine to operate over a wide gallonage range of 150 to 1,000 gallons per minute. This makes it possible for the operator to change the sprinkler nozzle size, without the need to change the turbine size.

A still further additional object of this invention is to simplify the operation of a turbine driven sprinkler machine so that the possibility of the operator setting the bypass valve too far open is eliminated and thus the possibility of the machine stalling in the field due to improper valve setting is minimized or eliminated.

A further additional object of this invention is to provide a simple spring tension adjustment of the speed control for the turbine which simplifies the operation thereof.

One of the big advantages of the governor system disclosed by this invention is in the amount of range which it permits the operator and in the automatic operation thereof which tends to keep the speed of the sprinkler irrigation machine constant with great variations in load. The many problems set forth above with known prior art irrigation machines are eliminated by this invention.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a top plan view of the important operating elements of this invention.

FIG. 6 is a view taken generally along line 6—6 of FIG. 5.

FIG. 7 is a cross-sectional and perspective view of the front cable guide and stop actuating portion of the device of FIG. 1.

DESCRIPTION OF THE PREFERRED EMBODIMENT

Figure 1:
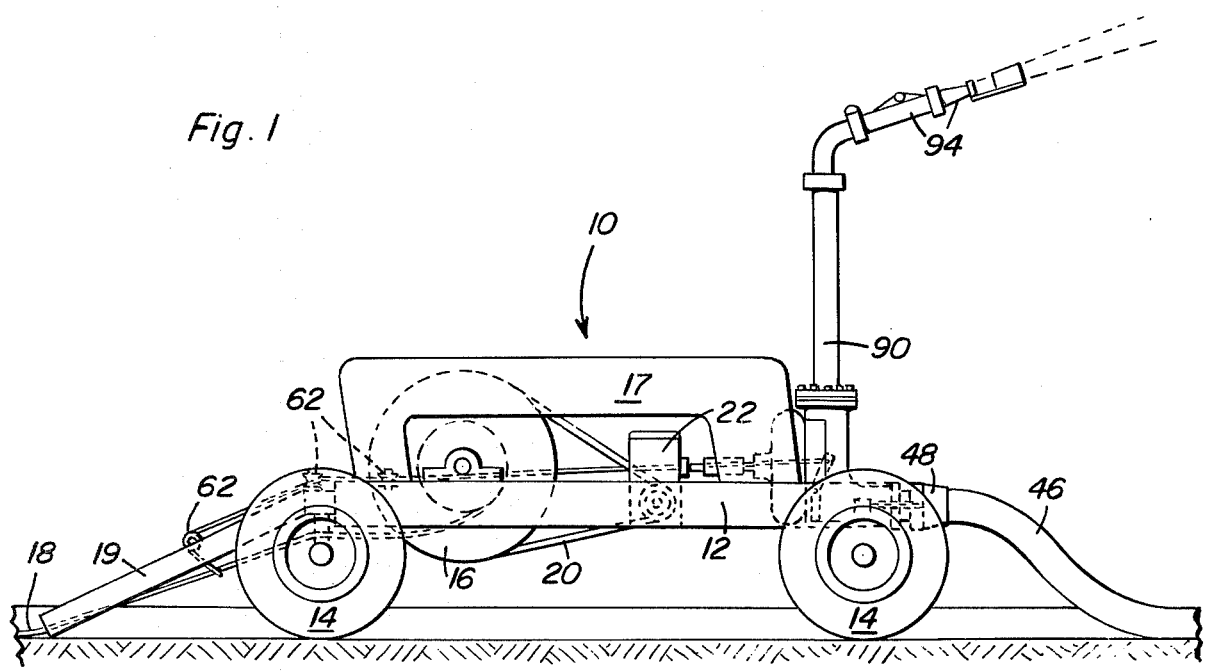
FIG. 1 is a side elevational view of the sprinkler machine of this invention.

Referring to FIG. 1 of the drawing reference numeral 10 indicates the device of this invention. The turbine and hydraulic governor system of this invention is shown mounted on a traveling sprinkler irrigation vehicle having a general frame 12 appropriately mounted on wheels 14 with a cable or line reel 16 for taking up the line 18 thereon in the conventional manner. Said reel 16 is driven by endless flexive torque transfer means 20 from speed reduction gearing 22 which is appropriately coupled by flexible coupling connections 24 and 28 and coupler 26 to the output shaft 36 of turbine. The rest of the support and drive for the wheels 14, etc. are conventional and well known in the art and do not form a part of the invention herein.

Figure 2:
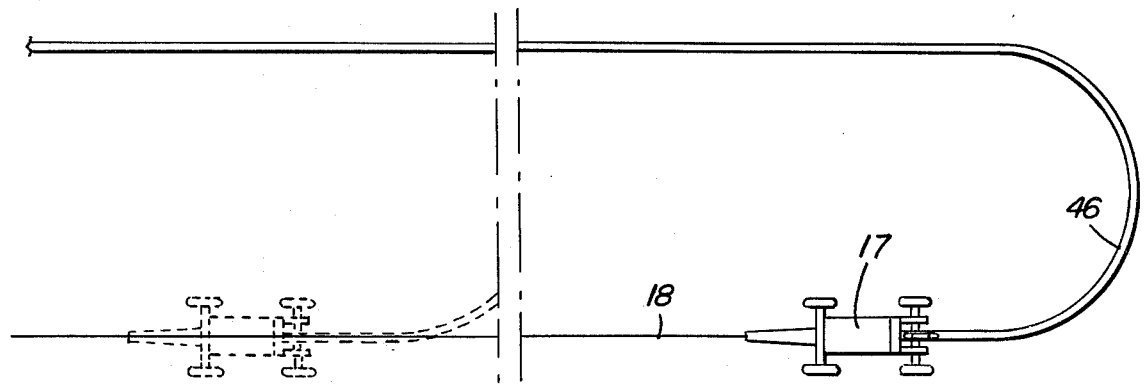
FIG. 2 is a top plan view of the sprinkler vehicle traversing a field being irrigated.

FIG. 2 shows in general how a vehicle of this type operates to irrigate a field. The line 18 is laid out over the desired path of travel for the vehicle 17 and said vehicle will travel the course as prescribed by the line 18 drawing behind it the supply hose 46 appropriately connected to a water supply pump or water pressure connection.

Looking at FIGS. 5 and 6, the turbine housing and water bypass housing are indicated generally by reference numeral 30. The water bypass housing 41, as seen in FIG. 6, has part of the turbine blade housing integral therewith. The outer turbine housing 31 is appropriately bolted to the base housing structure by bolts 33 appropriately spaced at the outer edge and circumferentially thereof. Bearing means 38 with mechanical seal 40 to prevent leakage support the turbine output shaft 36 which in turn has a blade hub 34 fastened thereon by appropriate means so as to drive the shaft 36 when the turbine blades 32 are driven by the incoming water. As can be seen from the water flow lines in FIG. 6, this turbine is of the inward radial flow type, which is an important feature of this invention.

The main housing structure 41 has a water input portion 43 integral therewith. This input portion has a bell shaped housing structure 44 with an opening 45 for reception of the coupling 48, 49 of the hose 46. The coupling 48 has a reduced coupling portion 49 with appropriate gasket means 50 for sealing between the outer surface of the coupling portion 49 and the inner surface of the bell housing 44, as best seen in FIG. 6. The foregoing described structure is securely mounted on the irrigation vehicle frame 12 by conventional means such as the support plate 13 and appropriate bolts and nuts 15. Other supporting structure (not shown) may be provided to achieve the desired strength of the device.

Looking at FIG. 5, the adjustment chain 110 and hooks 108, together with the adjusting supports 112 are shown. This structure provides a secure positive lock for the hose coupling, and yet one which is adjustable and also very quickly released for uncoupling the hose from the vehicle.

The water bypass valve, best seen in FIG. 6, is indicated by reference numeral 52 and is fixedly attached to rotatable shaft 54 passing through the housing and supported by a bearing (not shown) within the support portion 56 of said housing. The shaft 54 is connected to the control lever 58, with said control lever being responsive to the speed control mechanism to be described below, and lever 58 is connected to line 60. The end of line 60 passes through the bushing 63 at the end of lever 58 opposite to shaft 54. The line 60 is appropriately secured to the bushing 63 by means of knot 61, best seen in FIG. 5. The line 60 passes over appropriately spaced pulleys 62 on the vehicle frame and terminates in a line responsive loop 98, best seen in FIG. 7. Near the end of the proposed travel of the vehicle as prescribed by line 18, a limit stop member 96 is secured to line 18. Thus when the vehicle reaches this limit stop 96 the loop 98 attached to line 60 will cause tension to be applied to the line 60 and this will in turn flip lever 58 from the on and operating position of the internal valve 52 actuated thereby to the off position. Looking at FIG. 6, the off position of the device is shown by the vertical dotted line portion of the valve 52 wherein all of the water coming in the input portion 43 (as shown by A) passes through the bypass structure to point C without any of it going through the turbine. The operating or on position of the valve 52 begins as shown in solid lines with the valve completely closing the opening between the passageways A and C so that all of the water must pass through the turbine. To give control over the turbine speed and operation of the vehicle the valve plate 52 will be partially opened to various extents, by water hydraulic forces reacting against the control plate 52.

Figure 3:
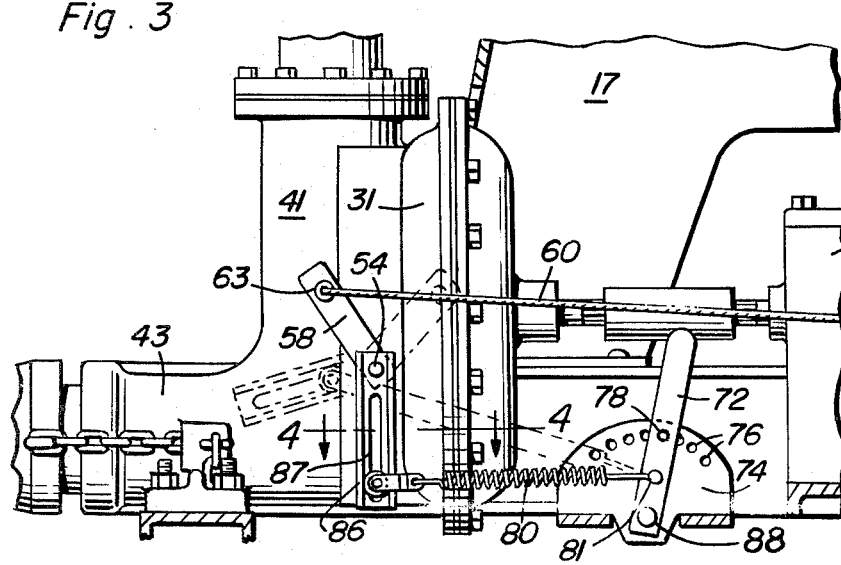
FIG. 3 is an enlarged view of the machine of FIG. 1 as viewed from the right side thereof, in part, showing the turbine, bypass valve, and speed control adjustment means therefor.
Figure 4:
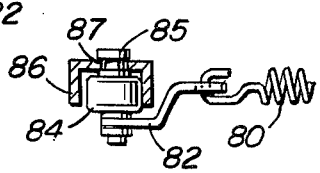
FIG. 4 is a view taken generally along line 4—4 of FIG. 3.

FIG. 3 shows the adjustment for such operation comprising the channel member 86 which is fixedly attached to the shaft 54 for movement along with the lever 58. Within the channel member 86 is a roller structure 84 which is connected to a spring 80 through connection 82. The other end of the spring 80 is attached at point 81 to a speed control lever 72 which is pivotally mounted on the support bracket 74 at point 88. Support bracket 74 has holes 76 along the arcuate circumference thereof for engagement by a locking pin 78 on the lever 72. Thus the operator can adjust the speed by moving the lever 72 to increase or decrease the tension on the spring 80. This in turn effecting the action of channel member 56 through shaft 54 and the valve 52. The lever 58 and cord 60 merely determine the on or off position of the valve with the speed regulating adjustment effect of said valve being determined by the adjustment of the lever 72 through the associated structure already described.

The upper portion of the water passage housing 41 supports the sprinkler head 94 through tube member 90 mounted securely at the top of said housing as best seen in FIGS. 1 and 6. The tube member 90 has appropriate flange portions 66 and is held in place by the flange 67 and appropriate bolts 64. A gasket 70 for prevention of leakage is also provided. The part circle sprinkler head 94 may be changed by the operator to increase or decrease the amount of water being sprayed as is well known in the art.

The operation of the device is as follows: water under pressure is applied through the hose 46 to coupling 48 to the input portion A of the housing 43 and when the lever 58 is in the dotted position shown the valve 52 is fully opened and in fact closes the outlet from the turbine motor so that all of the water passes on through area C of the housing 41. The channel slot 87 in the channel member 86 has the additional function when the lever 58 is thrown to the off position the roller 84 and the retainer structure 85 will pass near the center, as shown in dotted lines in FIG. 3, to reduce the cord tension required to move the valve to the stop or off position. At this point the entire flow of water is bypassing the turbine motor and no vehicle movement occurs.

When the cable is reeled out for the next run the lever 58 automatically flips to the operating position. The valve 52 then comes under the control of the speed regulating mechanism including the channel member 86 and the speed adjusting lever 72 through the spring 80. It can thus be seen that by appropriate adjustment of the lever 72 the amount of flow through the inward radial flow turbine can be increased or decreased for a broad speed control thereof, while the inherent regulation of the turbine and bypass valve combination, as set forth herein, will take care of a wide range of load conditions normally encountered in the field.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Irrigation apparatus comprising; a ground moving vehicle, sprinkler means supported by said vehicle, water supply means connected to said vehicle, turbine means actuated by water flow through the apparatus for driving same, and governor means associated with said turbine means for sensing variations in load to automatically control the speed of the vehicle over the ground.

2. The structure as set forth in claim 1, wherein the turbine means is of the radial inward flow type.

3. The structure as set forth in claim 2, wherein the governor means associated with said turbine includes a bypass valve which in one position diverts all water from the turbine and in another operating position controls the speed of said turbine.

4. The structure set forth in claim 3, together with line following structure and control means actuated by said line to turn the valve from on to off to stop the vehicle at the end of each run.

5. The structure set forth in claim 4, together with adjustable speed control means attached to said valve for changing the range of automatic operation thereof.

6. The structure set forth in claim 5, wherein the speed control means includes a channel member connected to said valve and a roller movable along said channel means and connected through a spring to an adjusting lever for control by the operator.

7. A hydraulic actuated load sensing governor device for a hydraulic turbine drive for a sprinkler vehicle comprising; a housing for hydraulic fluid, an input coupling on said housing for connection to a source of hydraulic fluid, a first output from said housing coupled to sprinkler means, a second output from said housing coupled to a turbine, an output from said turbine to a load which may vary, and a valve means within said housing for diverting hydraulic fluid flow from said first output to the second output.

8. The structure as set forth in claim 7, wherein the valve means includes additional means for adjusting the range of automatic operation of said valve as the load conditions on the turbine change.

9. The structure set forth in claim 8, wherein the additional means include a channel member, a roller engageable with the channel member, a spring connected at one end to the roller, and an adjustable lever attached to the other end of said spring to increase or decrease the tension of said spring by an operator.

10. The structure set forth in claim 9, wherein the turbine is of the inward radial type.

11. The structure set forth in claim 7, wherein the turbine is of the inward radial type.

12. The stucture set forth in claim 8, wherein the turbine is of the inward radial type.

* * * * *